(12) United States Patent
Chu et al.

(10) Patent No.: US 8,995,257 B2
(45) Date of Patent: Mar. 31, 2015

(54) VHT TDLS

(75) Inventors: Liwen Chu, San Ramon, CA (US);
George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 264 days.

(21) Appl. No.: 13/360,345

(22) Filed: Jan. 27, 2012

(65) Prior Publication Data
US 2013/0194920 A1 Aug. 1, 2013

(51) Int. Cl.
*H04L 12/26* (2006.01)
*H04W 40/24* (2009.01)

(52) U.S. Cl.
CPC .................................. *H04W 40/246* (2013.01)
USPC .......................... 370/230; 370/230.1; 370/231

(58) Field of Classification Search
CPC . H04L 47/10; H04L 2012/5631; H04L 47/15; H04L 47/2441; H04L 47/70
USPC .............................. 370/230, 230.1, 231, 236
See application file for complete search history.

(56) References Cited

U.S. PATENT DOCUMENTS

| | | | |
|---|---|---|---|
| 2003/0050012 A1* | 3/2003 | Black et al. ...................... | 455/62 |
| 2010/0046455 A1* | 2/2010 | Wentink et al. .................. | 370/329 |
| 2010/0177712 A1* | 7/2010 | Kneckt et al. ................... | 370/329 |
| 2011/0069689 A1* | 3/2011 | Grandhi et al. ................. | 370/338 |
| 2011/0090821 A1* | 4/2011 | Seok .............. | 370/255 |
| 2011/0103280 A1 | 5/2011 | Liu et al. | |
| 2011/0110349 A1* | 5/2011 | Grandhi ......................... | 370/338 |
| 2011/0222453 A1 | 9/2011 | Kwon et al. | |
| 2011/0225440 A1 | 9/2011 | Kwon et al. | |
| 2011/0249605 A1 | 10/2011 | Kwon et al. | |
| 2011/0255455 A1* | 10/2011 | Seok .............................. | 370/311 |
| 2011/0261742 A1 | 10/2011 | Wentink | |
| 2011/0280234 A1* | 11/2011 | Wentink ........................ | 370/338 |
| 2012/0026997 A1* | 2/2012 | Seok et al. ..................... | 370/338 |

OTHER PUBLICATIONS

Sandhya, Patil et al., IEEE P802.11 Wireless LANs Comment resolution for CIDs: 2110, 3578, 2288, Nov. 2011, IEEE 802.11-yy/xxxxr01, pp. 1-5.
Stacey et al., IEEE P802.11 Wireless LANs Specification Framework for TGac, Jan. 19, 2011, IEEE 802.11-09/0992r21, pp. 1-45.
Merlin et al., Partial AID Field, Nov. 17, 2010, IEEE 802.11-11/0039r0, slides 1-8.
Chu et al., Frame Header Compression, Jan. 16, 2012, IEEE 802.11-12/0110r3, slides 1-10.

* cited by examiner

*Primary Examiner* — Hassan Phillips
*Assistant Examiner* — Siren Wei
(74) *Attorney, Agent, or Firm* — Allen, Dyer, Doppelt, Milbrath & Gilchrist, P.A.

(57) ABSTRACT

TDLS support in VHT devices is enabled through the use of added VHT fields in the TDLS frames. A VHT TDLS direct link can be setup through a respective TDLS Setup Request/Response with added field announcing VHT Capabilities of the VHT device and the peer device. Added VHT Operation field in the TDLS Setup Confirm frame adds supports between VHT peer devices for non-VHT BSS and VHT BSS. Two VHT STAs can establish wider TDLS channel than BSS operating channel through TDLS establishment. VHT off channel support is enabled by adding Wide Bandwidth Channel Switch field in the TDLS Channel Switch Request frame and no changes to TDLS Channel Switch Response. A VHT Capabilities field is also added to TDLS Discovery Response frame to inform peer devices of device capabilities.

28 Claims, 1 Drawing Sheet

VHT TDLS

RELATED APPLICATIONS

The present application is related to 11-SCL-0233US01 (U.S. application Ser. No. 13/344,351, filed Jan. 5, 2012).

BACKGROUND OF THE INVENTION

1. Field of the Invention

The present invention relates, in general, to supporting TDLS (tunneled direct link setup) in wireless devices, and, more particularly, to supporting TDLS direct link in VHT (very high throughput) devices.

2. Relevant Background

In wireless communication, TDLS enables devices to negotiate between themselves methods that can avoid or reduce network congestion. In a conventional wireless network, communication traffics from device A is routed through the AP device in a BSS (basic service set) to device B. TDLS allows for direct communication link between device A and device B in a BSS.

There is a need for TDLS that supports Very High Throughput (VHT) devices.

SUMMARY OF THE INVENTION

Briefly stated, the present invention involves supporting VHT TDLS direct link in peer VHT devices.

According to an embodiment of the invention, a method of VHT TDLS communication for a VHT STA (very high throughput station) comprises sending or receiving a TDLS frame enhanced by VHT to or from a peer STA and establishing a TDLS direct link with the peer VHT STA. In one aspect of the embodiment, the TDLS frame enhanced by VHT is a TDLS Setup Request frame comprising a Source Association ID information element (IE) and a VHT Capabilities IE to indicate the supported VHT capabilities. In another aspect of the embodiment, the TDLS frame enhanced by VHT is a TDLS Setup Response frame comprising a Destination Association AID IE and a VHT Capabilities IE to indicate the supported VHT capabilities. In one aspect of the embodiment, the TDLS frame enhanced by VHT is a VHT TDLS Setup Confirm frame comprising a VHT Operation IE. In another aspect of the embodiment, the VHT Operation IE defines VHT operations in the VHT TDLS direct link of a non-VHT BSS or a VHT BSS, e.g., operating channel bandwidth, primary channel, supported MCS. In one aspect of the embodiment, two VHT TDLS STAs can negotiate wider TDLS direct link channel bandwidth than the BSS operating channel through direct link establishment. In another aspect of the embodiment, the Extended Capabilities IE comprises a "TDLS wider bandwidth on base channel capable" field to indicate if a VHT STA supports wider TDLS direct link establishment.

According to an embodiment of the invention, a method of VHT TDLS communication for a VHT STA comprises sending or receiving a TDLS frame enhanced by VHT to or from a peer STA and switch to a 80 MHz/160 MHz/80 MHz+80 MHz off channel with the peer VHT STA. In one aspect of the embodiment, the TDLS frame enhanced by VHT is a VHT TDLS Channel Switch Request frame comprising a Wide Bandwidth Channel Switch IE. In another aspect of the embodiment, the Wide Bandwidth Channel Switch IE indicates 80 MHz, 160 MHz, or 80 MHz+80 MHz channel. In one aspect of the embodiment, the TDLS frame enhanced by VHT is a normal TDLS Channel Switch Response frame.

According to an embodiment of the invention, a method of VHT TDLS communication for a VHT STA comprises sending or receiving a TDLS frame enhanced by VHT to or from a peer STA and find if the peer STA has the VHT capabilities. In one aspect of the embodiment, the TDLS frame enhanced by VHT is a VHT TDLS Discovery Response frame comprising a VHT Capabilities IE.

According to an embodiment of the invention, a non-transitory computer-readable medium comprises a TDLS frame enhanced by VHT. In one aspect of the embodiment, the TDLS frame enhanced by VHT is a TDLS Setup Request frame comprising a Source Association ID IF and a VHT Capabilities IE. In another aspect of the embodiment, the Extended Capabilities IE comprises a "TDLS wider bandwidth on base channel capable" field. In one aspect of the embodiment, the TDLS frame enhanced by VHT is a TDLS Setup Response frame comprising a Destination Association AID IE and a VHT Capabilities IE. In another aspect of the embodiment, the TDLS frame enhanced by VHT is a TDLS Setup Confirm frame comprising a VHT Operation IE. In another aspect of the embodiment, the VHT Operation IE defines VHT operations in the VHT TDLS direct link of a non-VHT BSS or a VHT BSS, e.g., operating channel bandwidth, primary channel, supported MCS. In one aspect of the embodiment, the TDLS frame enhanced by VHT is a TDLS Channel Switch Request frame comprising a Wide Bandwidth Channel Switch IE. In another aspect of the embodiment, the Wide Bandwidth Channel Switch IE indicates 80 MHz, 160 MHz, or 80 MHz+80 MHz channel. In one aspect of the embodiment, the TDLS frame enhanced by VHT is a normal TDLS Channel Switch Response frame. In one aspect of embodiment, the TDLS frame enhanced by VHT is a TDLS Discovery Response frame comprising a VHT Capabilities IE.

According to an embodiment of the invention, a VHT STA comprises an input-output processing portion configured for sending or receiving a TDLS frame enhanced by VHT.

DETAILED DESCRIPTION OF THE PREFERRED EMBODIMENTS

Figure 1:
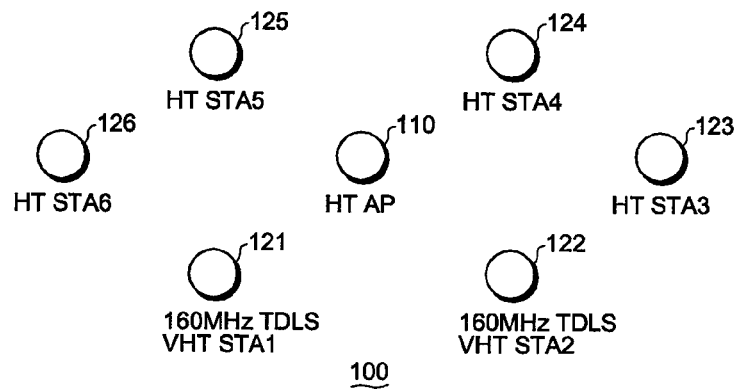
FIG. 1 illustrates an example of VHT TDLS support in non-VHT BSS according to an embodiment of the invention.

In a BSS (basic service set), if two STAs want to exchange frames, the frames must be forwarded by the AP of the BSS. However, TDLS allows two STAs in a BSS to establish TDLS direct link. After TDLS link establishment, two STAs can exchange frames directly through TDLS direct link without the AP's involvement. TDLS Setup Request, TDLS Setup Response, TDLS Setup Confirm are used for such TDLS direct link establishment. The STA that initiates the TDLS establishment by sending TDLS Setup Request is called TDLS Initiator. The STA that responds to the TDLS establishment request by sending TDLS Setup Response is called TDLS Responder. TDLS Initiator and TDLS Responder are called TDLS peer STAs. However, TDLS Setup Request, TDLS Setup Response, and TDLS Setup Confirm do not support VHT negotiation for TDLS direct link.

In a BSS the does not support VHT operation (non-VHT BSS), two VHT STAs may want to establish direct link between them. If two VHT STAs establish TDLS direct link, VHT features can be used between them, e.g. longer frame, bandwidth negotiation. These VHT features can improve throughput of the VHT direct link. After adding VHT Capabilities IE, VHT Operation IE, AID to TDLS setup Request, TDLS Setup Response, and TDLS Setup Confirm, two VHT STAs can sets up VHT direct link in a non-VHT BSS.

In a VHT BSS, a VHT STA may support wider channel bandwidth than BSS's operating channel. For example, a VHT STA may support 160 MHz operation in a 20 MHz VHT BSS. In the TDLS protocol, two VHT STAs can only use wider TDLS direct link channel through channel switch only if they support optional TDLS channel switch. The direct link channel after TDLS channel switch is called the off channel. If two VHT TDLS STAs can establish wider direct link channel during TDLS direct link establishment procedure without TDLS channel switch, more VHT features can be used in TDLS direct link without implementing optional TDLS channel switch functionality.

Table 1 shows an exemplary TDLS Setup Request frame and a TDLS Setup Response frame with VHT Capabilities IF according to an embodiment of the invention.

TABLE 1

| TDLS Setup Request | | TDLS Setup Response | |
|---|---|---|---|
| Order | Information | Order | Information |
| 1 | Category | 1 | Category |
| 2 | DLS Action (TDLS Setup Request) | 2 | DLS Action (TDLS Setup Request) |
| 3 | Destination MAC Address | 3 | Status Code |
| 4 | Source MAC Address | 4 | Destination MAC Address |
| 5 | Capability Information | 5 | Source MAC Address |
| 6 | DLS Timeout Value | 6 | Capability Information |
| 7 | Supported Rates | 7 | Supported Rates |
| 8 | Extended Supported Rates | 8 | Extended Supported Rates |
| 9 | HT Capabilities | 9 | HT Capabilities |
| 10 | Source Association ID | 10 | Destination Association AID |
| 11 | VHT Capabilities | 11 | VHT Capabilities |

Referring to Table 1, "VHT Capabilities" and the "TDLS peer STA's Association ID" were added to the TDLS Setup Request frame and the TDLS Setup Response frame. In the TDLS Setup Request, Source Association ID is added to order 10 and VHT Capabilities is added to order 11. In the TDLS Setup Response, Destination Association AID is added to order 10 and VHT Capabilities is added to order 11. With these added elements, VHT transmissions are allowed in a direct link with a VHT BSS. Also, VHT frame power save is allowed, since the peer STA's Association ID is known.

The following TDLS properties are still true after VHT enhancement: the establishment of direct link between TDLS peer STAs which continues to be transparent to the AP; and TDLS peer U-APSD (unscheduled automatic power save delivery) and TDLS peer PSM power mechanisms can be used.

Also, TDLS direct link can further use features that are different from the BSS's features. EDCA (enhanced distributed channel access) features can be used by TDLS direct link in a non-QoS (quality of service) BSS when the EDCA Parameter Set IE is used. HT (high throughput) features can also be used by TDLS direct link for a non-HT BSS when the HT Operation IE is used.

This invention allows that TDLS peer STAs use VHT features in a non-VHT BSS when supported. A VHT TDLS STA uses the VHT capabilities that its peer STA supports to transmit VHT frames to its peer STA in TDLS direct link.

VHT TDLS can further support wider TDLS channel than BSS operating channel during TDLS direct link establishment. According to one aspect of the embodiment, a "TDLS wider bandwidth on base channel capable" field can be added to the Extended Capabilities IE to indicate if the VHT TDLS STA supports wider TDLS channel establishment. Preferably, this field can be 1-bit. This can avoid having a TDLS Initiator trying to establish a wider direct link with the TDLS Responder that does not support wider direct link operation. In wider TDLS direct link setup, the VHT STA that sends TDLS Setup Request shall have DFS (Dynamic Frequency Selection) capability. The DFS capability can guarantee that the wider TDLS channel doesn't interfere with the nearby radar. The selected direct link channel shall also be no wider than the minimum value of Supported Channel Width Sets of two VHT TDLS STAs as indicated by VHT Capabilities IEs. In a HT BSS (high throughput basic service set), the TDLS channel shall use the primary channel as the primary channel of TDLS direct link. In a non-HT BSS, the TDLS channel shall use the operating channel as the primary channel of TDLS direct link.

Table 2 shows an exemplary TDLS Setup Confirm frame with VHT Operation IE according to an embodiment of the invention.

TABLE 2

| TDLS Setup Confirm | |
|---|---|
| Order | Information |
| 1 | Category DLS Action (TDLS Setup Confirm) |
| 2 | Status Code |
| 3 | Dialog Token |
| 4 | RSNIE (robust security network information element) |
| 5 | EDCA Parameter Set |
| 6 | FTIE |
| 7 | Timeout Interval IE |
| 8 | HT Operation |
| 9 | Link Identifier |
| 12 | VHT Operation |

Referring to Table 2, VHT Operation IE is added to order 12. VHT Operation IE needs to be added to the TDLS Setup Confirm frame to define the VHT operation in the TDLS direct link in a non-VHT BSS or VHT BSS. The VI-IT Operation IE defines the VHT operation in a non-VHT BSS. The VHT Operation IE also defines the VHT operation in a VHT BSS when the wider direct link is established. The VHT TDLS Initiator decides the VHT operation per the VHT capabilities that two VHT TDLS STAs support.

FIG. 1 illustrates an example of VHT TDLS support in non-VHT BSS according to an embodiment of the invention.

Referring to FIG. 1, system 100 including 40 MHz HT AP (high throughput access point) 110, 160 MHz VHT TDLS STAs STA1-STA2 121-122, and HT STAs STA3-STA6 123-126. The BSS's operating channel of system 100 is 40 MHz channel. As HT AP 110 is a non-VHT BSS, VHT STA1 121 and VHT STA2 122 need additional support in order to communicate in VHT TDLS.

STA1 121 sends TDLS Setup Request with VHT Capabilities IE to STA2 122. Then STA2 122 sends TDLS Setup Response with VHT Capabilities IE to STA1. Now both STA1 121 and STA2 122 know VHT capabilities of each other. Thus, a TDLS initiator, i.e., STA1 121, can now decide the VHT operation of VHT direct link and notify the TDLS responder, i.e., STA2 122 for VHT link, per the following rules. The Basic MCS Set shall be the common TX/RX (transmit/receive) MCS (Modulation and Coding Schemes) set of the TDLS initiator and the TDLS responder or the mandatory MCS set. If VHT initiator STA1 121 decides to use wider channel bandwidth than the 40 MHz BSS operating channel during TDLS setup, STA1 121 shall be the IDO (independent dynamic frequency selection owner) STA. The wider TDLS direct link channel shall use the HT BSS (high throughput basic service set) primary channel as the primary channel. Since both STA1 121 and STA2 122 have 160 MHz capabilities, the VHT TDLS channel width can be as wide as 160 MHz if the 160 MHz channel doesn't interfere with the nearby radar.

Figure 2:
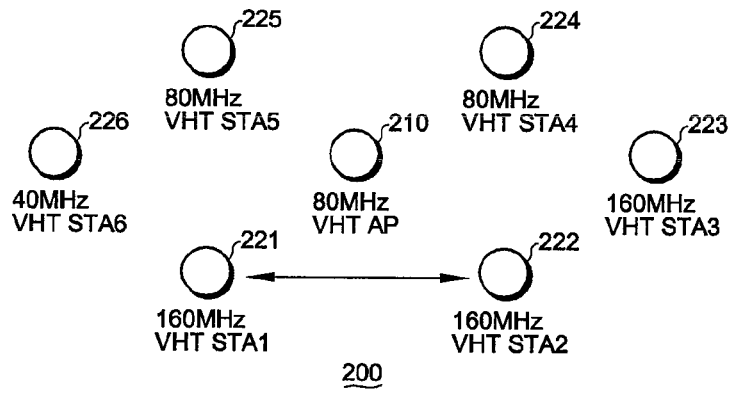
FIG. 2 illustrates an example of VHT TDLS off channel support according to an embodiment of the invention.

FIG. 2 illustrates an example of VHT TDLS off channel support according to an embodiment of the invention.

Referring to FIG. 2, system 200 includes 80 MHz VHT AP 210, 160 MHz VHT STA1-STA3 221-223, 80 MHz VHT STA4-STA5 224-225, and 40 MHz VHT STA6 226. 160 MHz VHT STA1 221 and STA2 222 want to do TDLS direct link. However, since VHT AP 210 supports only an 80 MHz on channel rate, the TDLS direct link between STA1 221 and STA2 222 will need to use an off channel (160 MHz/80 Mhz+80 MHz) to take advantage of their full bandwidth if at least one of STA1 221 and STA2 222 does not support "TDLS wider bandwidth on base channel capable".

Table 3 shows an exemplary TDLS Channel Switch Request and Response with added Wide Bandwidth Channel Switch information element (IE) according to an embodiment of the invention.

TABLE 3

| TDLS Channel Switch Request | | TDLS Channel Switch Response | |
| --- | --- | --- | --- |
| Order | Information | Order | Information |
| 1 | Category | 1 | Category |
| 2 | DLS Action (TDLS Channel Switch Request) | 2 | DLS Action (TDLS Channel Switch Response) |
| 3 | Target Channel | 3 | Status Code |
| 4 | Regulatory Class | 4 | Link Identifier |
| 5 | Secondary Channel Offset | 5 | Channel Switch Timing |
| 6 | Link Identifier | | |
| 7 | Channel Switch Timing | | |
| 8 | Wide Bandwidth Channel Switch | | |

Referring to Table 3, the Wide Bandwidth Channel Switch IE is added to Order 8 of the TDLS Channel Switch Request. The Wide Bandwidth Channel Switch IE, which can indicates 80 MHz/160 MHz/80 MHz+80 MHz channel, includes information such as the channel width (for 80 MHz/160 MHz/80 MHz+80 MHz), channel center frequency for segment 1 (for 80 MHz/160 MHz/80 MHz+80 MHz), and channel center frequency for segment 2 (for 80 MHz+80 MHz only). The Wide Bandwidth Channel Switch IE is added to the TDLS Channel Switch Request frame to support VHT off channel operations. No change is required for the TDLS Channel Switch Response frame.

Further, VHT TDLS STA should follow the TDLS off channel operation rules and the VHT medium access rules. The VHT TDLS peer STA initiating off channel switch is the IDO VHT STA.

Figure 3:
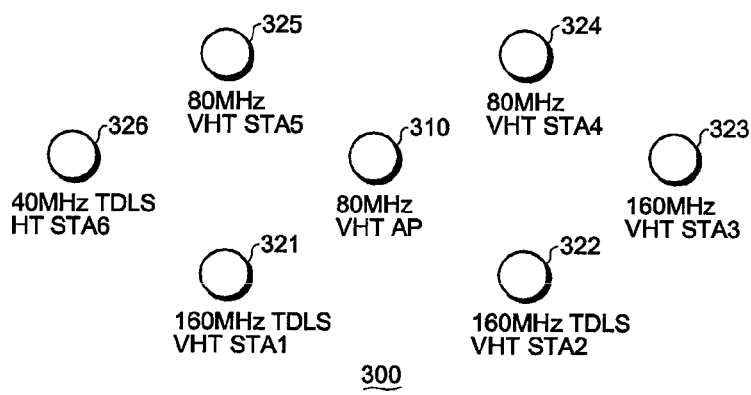
FIG. 3 illustrates an example of discovering TDLS VHT Capabilities in TDLS Discovery Response according to an embodiment of the invention.

FIG. 3 illustrates an example of discovering TDLS VHT Capabilities in TDLS Discovery Response according to an embodiment of the invention.

Referring to FIG. 3, wireless system 300 comprises 80 MHz VHT AP 310, 160 MHz VHT TDLS STA1 321 and STA2 322, 160 MHz VHT STA3 323, 80 MHz VHT STA4 324 and STA5 325, and 40 MHz TDLS HT STA6 326. If one does not explicitly indicate the VHT capabilities of 160 MHz VHT TDLS STA1 321 and STA2 322, STA1 321 and STA2 322 cannot be differentiated from 40 MHz TDLS HT STA6 326 with regards to VHT TDLS capabilities such as the added bandwidth.

Table 4 shows a TDLS Discovery Response frame with added VHT Capabilities according to an embodiment of the invention.

TABLE 4

| TDLS Discovery Response | |
| --- | --- |
| Order | Information |
| 1 | Category |
| 2 | Public Action (TDLS Discovery Response) |
| 3 | Dialog Token |
| 4 | Capability |
| 5 | Supported Rates |
| 6 | Extended Supported Rates |
| 7 | Supported Channels |
| 8 | RSNIE |
| 9 | Extended Capabilities |
| 10 | FTIE |
| 11 | Timeout Interval |
| 12 | Supported Regulatory Classes |
| 13 | HT Capabilities |
| 14 | 20/40 BSS Coexistence |
| 15 | Link Identifier |
| 16 | VHT Capabilities |

Referring to Table 4, VHT Capabilities is added to Order 16 of the TDLS Discovery Response frame. As such, the TDLS Discovery Response sent by a STA can inform its peer STAs of the STA's VHT capabilities.

In an embodiment, the present invention can be implemented in software as executed by a central processing unit. Software programming code, which can embody the present invention, is typically accessed by a microprocessor from long-term, persistent storage media of some type, such as a flash drive or hard drive. The software programming code may be embodied in any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be discussed further herein.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of very high throughput (VHT) tunneled direct link setup (TDLS) communication for a first VHT station operating in a non-VHT basic service set (BSS), the method comprising:
   sending a TDLS setup frame enhanced by VHT to a second VHT station, the TDLS setup frame comprising a 1-bit field indicating whether the first VHT station supports wider channel bandwidth than a BSS operating channel for TDLS direct link establishment;
   establishing a TDLS direct link with the second VHT station using the non-VHT BSS based upon the TDLS setup frame;
   switching a TDLS direct link channel;
   discovering VHT capabilities of the second VHT station via a VHT indicator in a non-VHT BSS reply frame from the second VHT station; and
   if the second VHT station is capable of VHT communication, the first VHT station establishes a VHT TDLS link with the second VHT station based upon the VHT indicator.

2. The method of claim 1, wherein the TDLS setup frame comprises a Source Association ID information element (IE) and a VHT Capabilities IE.

3. The method of claim 1, wherein the non-VHT BSS reply frame comprises a Destination Association ID IE and a VHT Capabilities IE.

4. The method of claim 1, wherein the TDLS setup frame is a VHT TDLS Setup Confirm frame comprising a VHT Operation IE.

5. The method of claim 4, wherein the VHT Operation IE defines VHT operations in a VHT TDLS direct link.

6. The method of claim 1, wherein the TDLS direct link uses a high throughput BSS primary channel in a high throughput BSS as a primary channel.

7. The method of claim 1, wherein the TDLS direct link uses a BSS operating channel in a non-high throughput BSS as a primary channel.

8. The method of claim 1, wherein a VHT Initiator is an independent dynamic frequency selection owner.

9. The method of claim 1, wherein an Extended Capabilities IE comprises a bandwidth capability field.

10. The method of claim 1, wherein a VHT Initiator setup TDLS wider channel if a TDLS Initiator and a TDLS Responder support TDLS wider bandwidth operation.

11. The method of claim 1, wherein the VHT TDLS setup frame is a VHT TDLS Channel Switch Request frame comprising a Wide Bandwidth Channel Switch IE.

12. The method of claim 1, wherein the VHT TDLS setup frame is a normal TDLS Channel Switch Response frame.

13. The method of claim 11, wherein the Wide Bandwidth Channel Switch IE indicates 80 MHz, 160 MHz, and 80 MHz+80 MHz TDLS direct link channel.

14. A non-transitory computer-readable medium comprising instructions for performing a method of very high throughput (VHT) tunneled direct link setup (TDLS) communication for a first VHT station operating in a non-VHT basic service set (BSS), the method comprising:
   sending a TDLS setup frame enhanced by VHT to a second VHT station, the TDLS setup frame comprising a 1-bit field indicating whether the first VHT station supports wider channel bandwidth than a BSS operating channel for TDLS direct link establishment;
   establishing a TDLS direct link with the second VHT station using the non-VHT BSS based upon the TDLS setup frame;
   switching a TDLS direct link channel;
   discovering VHT capabilities of the second VHT station via a VHT indicator in a non-VHT BSS reply frame from the second VHT station; and
   if the second VHT station is capable of VHT communication, the first VHT station establishes a VHT TDLS link with the second VHT station based upon the VHT indicator.

15. The non-transitory computer-readable medium of claim 14, wherein the TDLS setup frame comprises a Source Association ID information element (IS) and a VHT Capabilities IE.

16. The non-transitory computer-readable medium of claim 14, wherein the non-VHT BSS reply frame comprises a Destination Association ID IE and a VHT Capabilities IE.

17. The non-transitory computer-readable medium of claim 14, wherein the TDLS setup frame is a VHT TDLS Setup Confirm frame comprising a VHT Operation IE.

18. The non-transitory computer-readable medium of claim 17, wherein the VHT Operation IE defines VHT operations in a VHT TDLS direct link.

19. The non-transitory computer-readable medium of claim 14, wherein the TDLS direct link uses a high throughput BSS primary channel in a high throughput BSS as a primary channel.

20. The non-transitory computer-readable medium of claim 14, wherein the TDLS direct link uses a BSS operating channel in a non-high throughput BSS as a primary channel.

21. The non-transitory computer-readable medium of claim 14, wherein a VHT Initiator is an independent dynamic frequency selection owner.

22. The non-transitory computer-readable medium of claim 14, wherein an Extended Capabilities IE comprises a bandwidth capability field.

23. The non-transitory computer-readable medium of claim 14, wherein a VHT Initiator setup TDLS wider channel if a TDLS Initiator and a TDLS Responder support TDLS wider bandwidth operation.

24. The non-transitory computer-readable medium of claim 14, wherein the VHT TDLS setup frame is a VHT TDLS Channel Switch Request frame comprising a Wide Bandwidth Channel Switch IE.

25. A communication system comprising:
   an access point configured to provide a non-very high throughput (VHT) basic service set (BSS);
   first and second VHT stations configured to communicate with said access point in the non-VHT BSS and between each other via a VHT tunneled direct link setup (TDLS) communication, the VHT tunneled direct link setup comprising
   sending a TDLS setup frame enhanced by VHT to said second VHT station, the TDLS setup frame comprising a 1-bit field indicating whether the first VHT station supports wider channel bandwidth than a BSS operating channel for TDLS direct link establishment,
   establishing a TDLS direct link with the second VHT station using the non-VHT BSS based upon the TDLS setup frame,
   switching a TDLS direct link channel,
   discovering VHT capabilities of the second VHT station via a VHT indicator in a non-VHT BSS reply frame from the second VHT station, and
   if the second VHT station is capable of VHT communication, the first VHT station establishes a VHT TDLS link with the second VHT station based upon the VHT indicator.

26. The communication system of claim 25, wherein the TDLS setup frame comprises a Source Association ID information element (IE) and a VHT Capabilities IE.

27. The communication system of claim 25, wherein the non-VHT BSS reply frame comprises a Destination Association ID IE and a VHT Capabilities IE.

28. The communication system of claim 25, wherein the TDLS setup frame is a VHT TDLS Setup Confirm frame comprising a VHT Operation IE.

* * * * *

UNITED STATES PATENT AND TRADEMARK OFFICE
CERTIFICATE OF CORRECTION

PATENT NO.        : 8,995,257 B2                                          Page 1 of 1
APPLICATION NO.   : 13/360345
DATED             : March 31, 2015
INVENTOR(S)       : Chu et al.

It is certified that error appears in the above-identified patent and that said Letters Patent is hereby corrected as shown below:

In the Claims

Claim 15,              Delete: "IS"
Column 8, Line 11      Insert: --IE--

Signed and Sealed this
Eighteenth Day of August, 2015

Michelle K. Lee
*Director of the United States Patent and Trademark Office*